(12) United States Patent
Capecelatro et al.

(10) Patent No.: US 12,404,698 B1
(45) Date of Patent: Sep. 2, 2025

(54) PHYSICAL SENSOR SWITCH FOR PREMISES AUTOMATION

(71) Applicant: Josh.ai, Inc., Denver, CO (US)

(72) Inventors: Alex Nathan Capecelatro, Los Angeles, CA (US); Timothy Earl Gill, Denver, CO (US); Brian Hulme, Morrison, CO (US); Edward John McKenna, Jr., Denver, CO (US); Derek Murphy, Highlands Ranch, CO (US); Scott Lon Allen, Denver, CO (US)

(73) Assignee: Josh.ai, Inc., Denver, CO (US)

(*) Notice: Subject to any disclaimer, the term of this patent is extended or adjusted under 35 U.S.C. 154(b) by 761 days.

(21) Appl. No.: 17/504,831

(22) Filed: Oct. 19, 2021

Related U.S. Application Data

(60) Provisional application No. 63/109,237, filed on Nov. 3, 2020.

(51) Int. Cl.
| | |
|---|---|
| *E05B 47/00* | (2006.01) |
| *E05B 65/00* | (2006.01) |
| *E05B 65/06* | (2006.01) |
| *G07C 9/00* | (2020.01) |
| *H04L 12/28* | (2006.01) |

(52) U.S. Cl.
CPC ...... *E05B 47/0001* (2013.01); *E05B 65/0035* (2013.01); *E05B 65/06* (2013.01); *G07C 9/00174* (2013.01); *H04L 12/282* (2013.01); *E05B 2047/005* (2013.01)

(58) Field of Classification Search
CPC .. E05B 47/0001; E05B 65/0035; E05B 65/06; E05B 2047/005; G07C 9/00174; H04L 12/282
See application file for complete search history.

(56) References Cited

U.S. PATENT DOCUMENTS

| | | |
|---|---|---|
| 4,304,079 A | 12/1981 | Thorsten |
| 6,133,843 A | 10/2000 | Davidson |
| 6,250,162 B1 | 6/2001 | Amaike |
| 10,078,786 B2 | 9/2018 | Richardson |
| 11,060,705 B1 | 7/2021 | Danesh |
| 11,315,556 B2 | 4/2022 | Smith |
| 11,756,541 B1 | 9/2023 | Mrani |
| 2003/0043883 A1 | 3/2003 | Okuzono |
| 2003/0159910 A1 | 8/2003 | Caldwell |
| 2003/0210551 A1 | 11/2003 | Sevack |

(Continued)

OTHER PUBLICATIONS

Specification for Livolo digital touch switch VL-C701, [online], retrieved from https://livoloeurope.eu/livolo-wifi-touch-light-switch-with-glass-panel-vl-c701-11, website captured on Oct. 30, 2020 (Year: 2020).*

*Primary Examiner* — Charles Cai

(74) *Attorney, Agent, or Firm* — Van Pelt, Yi & James LLP

(57) ABSTRACT

A sensor is configured to receive an input associated with a human present in a physical space in which a device is deployed. A physical circuit path is configured to electrically couple an output signal generated by the sensor to a premises automation system processing component. A physical privacy switch is configured to have a first position and a second position, wherein the physical privacy switch connects the physical circuit path when in the first position and interrupts the physical circuit path when in the second position.

22 Claims, 13 Drawing Sheets

(56) References Cited

U.S. PATENT DOCUMENTS

| | | |
|---|---|---|
| 2006/0017805 A1* | 1/2006 | Rodman .................. H04N 7/15 |
| | | 348/E7.083 |
| 2007/0268506 A1 | 11/2007 | Zeldin |
| 2009/0056264 A1 | 3/2009 | Rosskamp |
| 2009/0206059 A1 | 8/2009 | Kiko |
| 2010/0148028 A1 | 6/2010 | Hand |
| 2013/0201316 A1 | 8/2013 | Binder |
| 2015/0264780 A1 | 9/2015 | Harris |
| 2017/0229811 A1 | 8/2017 | Clark |
| 2018/0116036 A1 | 4/2018 | Snyder |
| 2019/0064914 A1 | 2/2019 | Krishnakumar |
| 2019/0311721 A1 | 10/2019 | Edwards |
| 2019/0362718 A1 | 11/2019 | Bhargava |
| 2020/0196141 A1* | 6/2020 | Baker .................. H04W 12/02 |
| 2020/0258512 A1 | 8/2020 | Smith |
| 2020/0312317 A1 | 10/2020 | Kothari |
| 2023/0161917 A1* | 5/2023 | Lee .................... G06F 21/6245 |
| | | 726/34 |

* cited by examiner 206-i cap
206-ii body 423a
423b
422

423
422

425
423

VISUAL EXAMPLE

DEVICE EXAMPLE

PHYSICAL SENSOR SWITCH FOR PREMISES AUTOMATION

CROSS REFERENCE TO OTHER APPLICATIONS

This application claims priority to U.S. Provisional Patent Application No. 63/109,237 entitled MECHANICAL MICROPHONE SWITCH FOR PREMISES AUTOMATION filed Nov. 3, 2020 which is incorporated herein by reference for all purposes.

BACKGROUND OF THE INVENTION

One use for technology is to establish a better system of control. In premises automation, for example, home automation, a system controls various aspects of the premises such as lighting, music, and heating, ventilation, and air conditioning (HVAC) based in part on user input, in part to efficiently make the premises safer for humans and/or more comfortable for humans. To control each aspect of the premises automation system may be overwhelming or time consuming. It would be useful to have easier ways to maintain a system of control.

BRIEF DESCRIPTION OF THE DRAWINGS

Various embodiments of the invention are disclosed in the following detailed description and the accompanying drawings.

FIG. 8B is an illustration of a room with three coordinated devices after a physical privacy switch is turned on.

DETAILED DESCRIPTION

Figure 1:
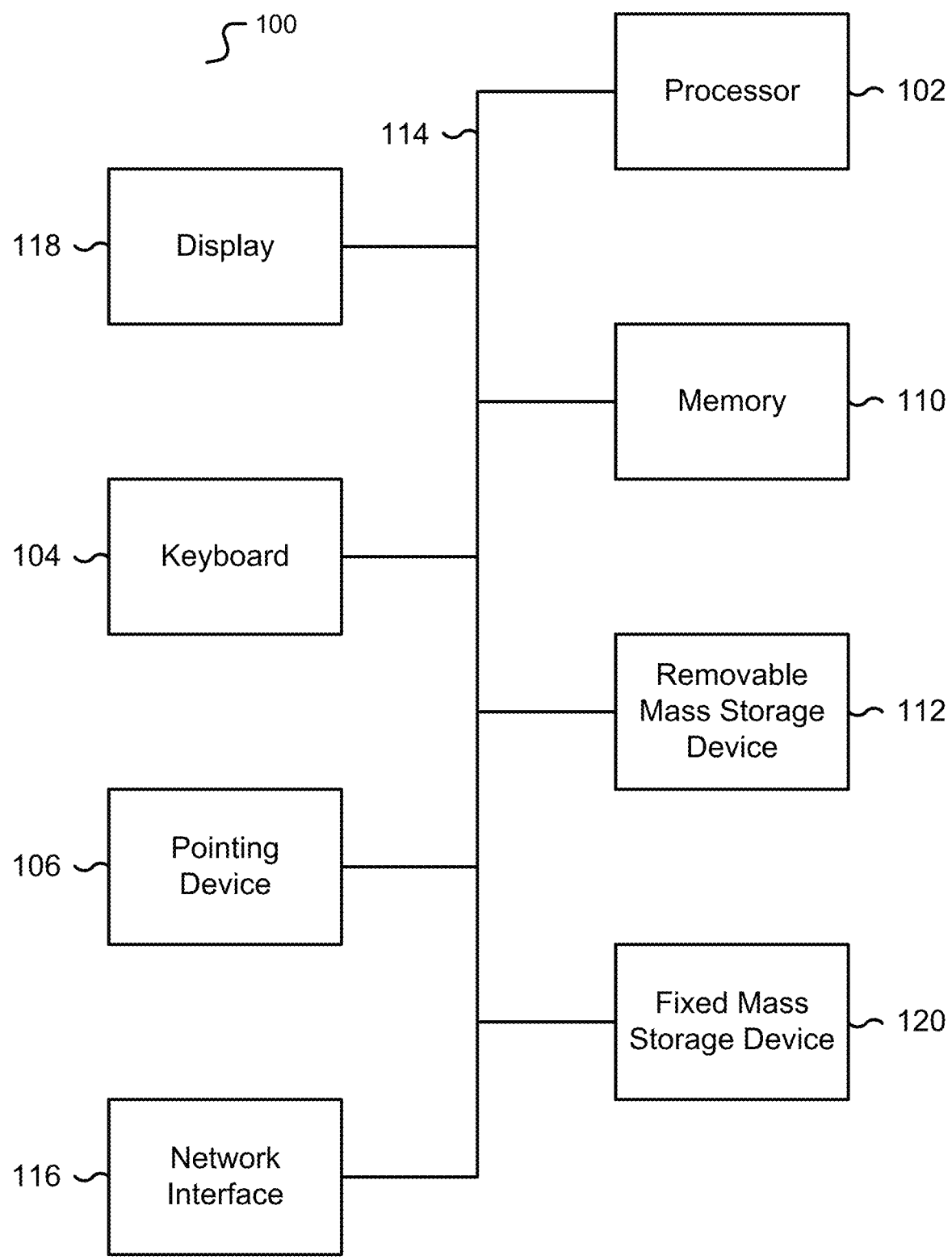
FIG. 1 is a functional diagram illustrating a programmed computer/server system for control of complex input in accordance with some embodiments.

The invention can be implemented in numerous ways, including as a process; an apparatus; a system; a composition of matter; a computer program product embodied on a computer readable storage medium; and/or a processor, such as a processor configured to execute instructions stored on and/or provided by a memory coupled to the processor. In this specification, these implementations, or any other form that the invention may take, may be referred to as techniques. In general, the order of the steps of disclosed processes may be altered within the scope of the invention. Unless stated otherwise, a component such as a processor or a memory described as being configured to perform a task may be implemented as a general component that is temporarily configured to perform the task at a given time or a specific component that is manufactured to perform the task. As used herein, the term 'processor' refers to one or more devices, circuits, and/or processing cores configured to process data, such as computer program instructions.

A detailed description of one or more embodiments of the invention is provided below along with accompanying figures that illustrate the principles of the invention. The invention is described in connection with such embodiments, but the invention is not limited to any embodiment. The scope of the invention is limited only by the claims and the invention encompasses numerous alternatives, modifications and equivalents. Numerous specific details are set forth in the following description in order to provide a thorough understanding of the invention. These details are provided for the purpose of example and the invention may be practiced according to the claims without some or all of these specific details. For the purpose of clarity, technical material that is known in the technical fields related to the invention has not been described in detail so that the invention is not unnecessarily obscured.

Concerns raised about premises automation include privacy concerns over the potential abuse of a premises automation system's observation of occupants, and aesthetic concerns on how a premises automation system presents itself to its occupants including visitors. A physical privacy switch for premises automation is disclosed. The physical privacy switch grants a stronger assurance that privacy from a sensor is maintained when asserted, and is lower-profile to be aesthetically discrete.

In one embodiment, the system includes an audio system. An audio system may include distributed microphones and/or an efficient integration with existing distributed premises sound systems, including smart sound systems. Audio systems may be improved for premises automation with simple and intuitive control, for example, having a user state out loud "please turn off the master bedroom lights at 8 pm tonight" and/or a system responding "got it, lights in the master bedroom will be turned off in a couple hours." Premises automation also includes controlling audio systems such as music and/or television audio channels. In one embodiment, the system includes a video system including a camera as a sensor.

FIG. 1 is a functional diagram illustrating a programmed computer/server system for control of complex input in accordance with some embodiments. As shown, FIG. 1 provides a functional diagram of a general purpose computer system programmed to provide premises automation in accordance with some embodiments. As will be apparent, other computer system architectures and configurations can be used for premises automation.

Computer system 100, which includes various subsystems as described below, includes at least one microprocessor subsystem, also referred to as a processor or a central processing unit ("CPU") 102. For example, processor 102 can be implemented by a single-chip processor or by multiple cores and/or processors. In some embodiments, processor 102 is a general purpose digital processor that controls the operation of the computer system 100. Using instructions retrieved from memory 110, the processor 102 controls the reception and manipulation of input data, and the output and display of data on output devices, for example display and graphics processing unit (GPU) 118.

Processor 102 is coupled bi-directionally with memory 110, which can include a first primary storage, typically a random-access memory ("RAM"), and a second primary storage area, typically a read-only memory ("ROM"). As is well known in the art, primary storage can be used as a general storage area and as scratch-pad memory, and can also be used to store input data and processed data. Primary storage can also store programming instructions and data, in the form of data objects and text objects, in addition to other data and instructions for processes operating on processor 102. Also as well known in the art, primary storage typically includes basic operating instructions, program code, data, and objects used by the processor 102 to perform its functions, for example, programmed instructions. For example, primary storage devices 110 can include any suitable computer-readable storage media, described below, depending on whether, for example, data access needs to be bi-directional or uni-directional. For example, processor 102 can also directly and very rapidly retrieve and store frequently needed data in a cache memory, not shown. The processor 102 may also include a coprocessor (not shown) as a supplemental processing component to aid the processor and/or memory 110.

A removable mass storage device 112 provides additional data storage capacity for the computer system 100, and is coupled either bi-directionally (read/write) or uni-directionally (read-only) to processor 102. For example, storage 112 can also include computer-readable media such as flash memory, portable mass storage devices, holographic storage devices, magnetic devices, magneto-optical devices, optical devices, and other storage devices. A fixed mass storage 120 can also, for example, provide additional data storage capacity. One example of mass storage 120 is an eMMC or microSD device. In one embodiment, mass storage 120 is a solid-state drive connected by a bus 114. Mass storages 112, 120 generally store additional programming instructions, data, and the like that typically are not in active use by the processor 102. It will be appreciated that the information retained within mass storages 112, 120 can be incorporated, if needed, in standard fashion as part of primary storage 110, for example RAM, as virtual memory.

In addition to providing processor 102 access to storage subsystems, bus 114 can be used to provide access to other subsystems and devices as well. As shown, these can include a display monitor 118, a communication interface 116, a touch (or physical) keyboard 104, and one or more auxiliary input/output devices 106 including an audio interface, a sound card, microphone, audio port, audio input device, audio card, speakers, a touch (or pointing) device, and/or other subsystems as needed. Besides a touch screen, the auxiliary device 106 can be a mouse, stylus, track ball, or tablet, and is useful for interacting with a graphical user interface.

The communication interface 116 allows processor 102 to be coupled to another computer, computer network, or telecommunications network using a network connection as shown. For example, through the communication interface 116, the processor 102 can receive information, for example data objects or program instructions, from another network, or output information to another network in the course of performing method/process steps. Information, often represented as a sequence of instructions to be executed on a processor, can be received from and outputted to another network. An interface card or similar device and appropriate software implemented by, for example executed/performed on, processor 102 can be used to connect the computer system 100 to an external network and transfer data according to standard protocols. For example, various process embodiments disclosed herein can be executed on processor 102, or can be performed across a network such as the Internet, intranet networks, or local area networks, in conjunction with a remote processor that shares a portion of the processing. Throughout this specification, "network" refers to any interconnection between computer components including the Internet, Bluetooth, WiFi, 3G, 4G, 4GLTE, GSM, Ethernet, intranet, local-area network ("LAN"), home-area network ("HAN"), serial connection, parallel connection, wide-area network ("WAN"), Fibre Channel, PCI/PCI-X, AGP, VLbus, PCI Express, Expresscard, Infiniband, ACCESS.bus, Wireless LAN, HomePNA, Optical Fibre, G.hn, infrared network, satellite network, microwave network, cellular network, virtual private network ("VPN"), Universal Serial Bus ("USB"), FireWire, Serial ATA, 1-Wire, UNI/O, or any form of connecting homogenous and/or heterogeneous systems and/or groups of systems together. Additional mass storage devices, not shown, can also be connected to processor 102 through communication interface 116.

An auxiliary I/O device interface, not shown, can be used in conjunction with computer system 100. The auxiliary I/O device interface can include general and customized interfaces that allow the processor 102 to send and, more typically, receive data from other devices such as microphones, touch-sensitive displays, transducer card readers, tape readers, voice or handwriting recognizers, biometrics readers, cameras, portable mass storage devices, and other computers.

In addition, various embodiments disclosed herein further relate to computer storage products with a computer readable medium that includes program code for performing various computer-implemented operations. The computer-readable medium is any data storage device that can store data which can thereafter be read by a computer system. Examples of computer-readable media include, but are not limited to, all the media mentioned above: flash media such as NAND flash, eMMC, SD, compact flash; magnetic media such as hard disks, floppy disks, and magnetic tape; optical media such as CD-ROM disks; magneto-optical media such as optical disks; and specially configured hardware devices such as application-specific integrated circuits ("ASIC"s), programmable logic devices ("PLD"s), and ROM and RAM devices. Examples of program code include both machine code, as produced, for example, by a compiler, or files containing higher level code, for example a script, that can be executed using an interpreter.

The computer/server system shown in FIG. 1 is but an example of a computer system suitable for use with the various embodiments disclosed herein. Other computer systems suitable for such use can include additional or fewer subsystems. In addition, bus 114 is illustrative of any interconnection scheme serving to link the subsystems. Other computer architectures having different configurations of subsystems can also be utilized.

Figure 2A:
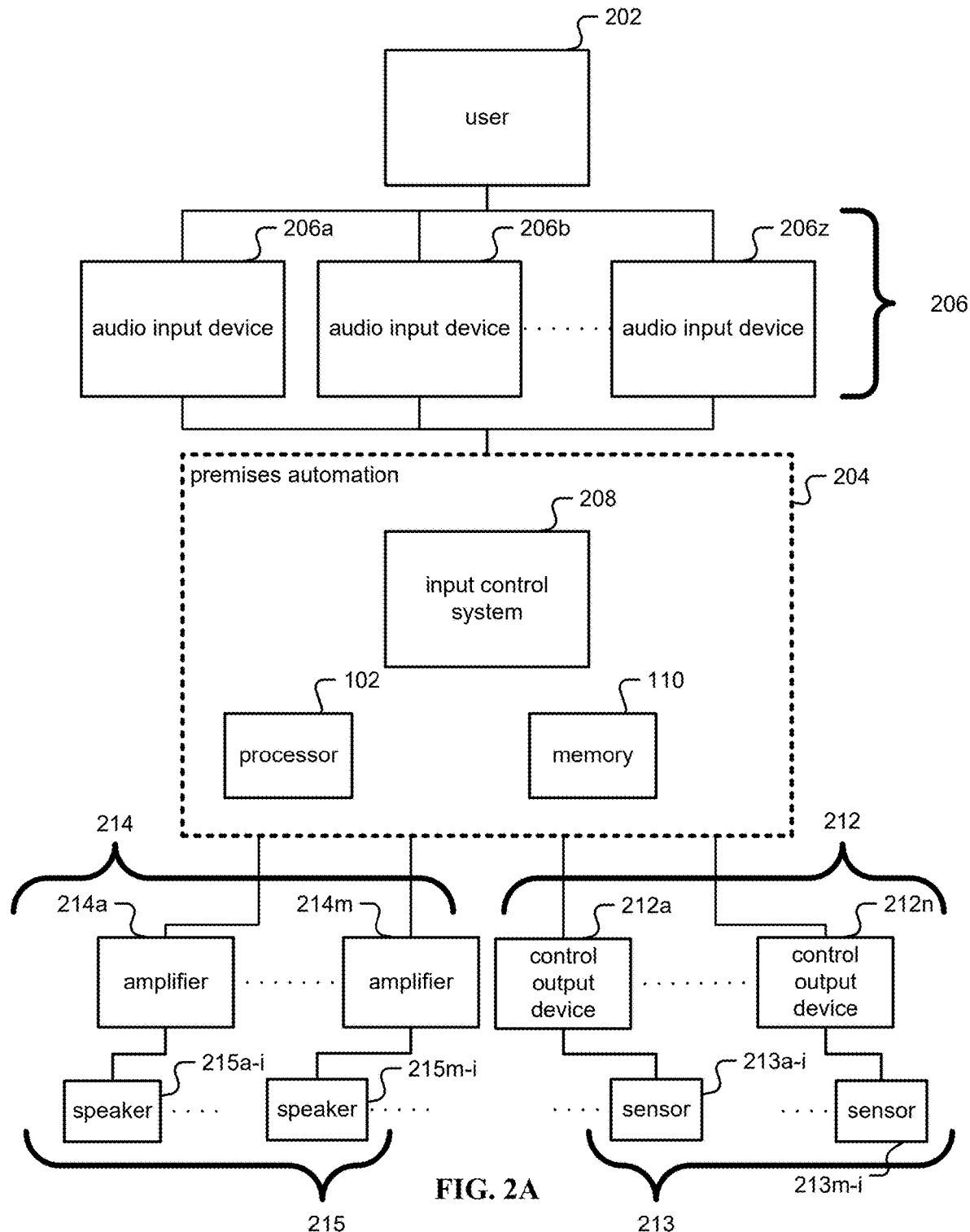
FIG. 2A is a block diagram illustrating an embodiment of a system for premises automation.

FIG. 2A is a block diagram illustrating an embodiment of a system for premises automation. User (202) is coupled to premises automation system (204), either through distributed sensor input devices (206), for example, audio input devices, here shown with three devices (206a), (206b), and (206z), if by way of speech, or directly to the input control system (208) if by way of written word, for example, by typing or texting on an associated app.

In one embodiment, premises automation system (204) is a computer system as shown in FIG. 1 and includes processor (102) and memory (110). In one embodiment, the premises automation system (204) is a mobile phone, computer, or dedicated smart home device. Without limitation, throughout this specification the dedicated smart home device referenced herein as a "core" device is illustrated as the premises automation system (204). In one embodiment, a physical phone, touchscreen, swipe-based keyboard, and/or virtual keyboard (104) is included for typing or texting. The audio input device(s) (206) may be coupled and/or part of the input control system (208) as well.

After interpreting programming, the input control system (208) may be coupled to one or more control output devices (212), here shown with more than two devices (212a), . . . , (212n). The control output devices (212) may be a single smart home hub (212a) and/or may include additional smart home devices for direct control. One or more other sensors (213) may be part of any control output device (212).

To cue feedback from premises automation core (204) to the user giving speech commands to one or more of the audio input devices (206), an existing distributed network of speakers (215) may be used by interfacing with an existing set of associated amplifiers (214). Premises automation core (204) may also playback music and/or television/media audio through the existing set of speakers and/or smart speakers (215).

Figure 2B:
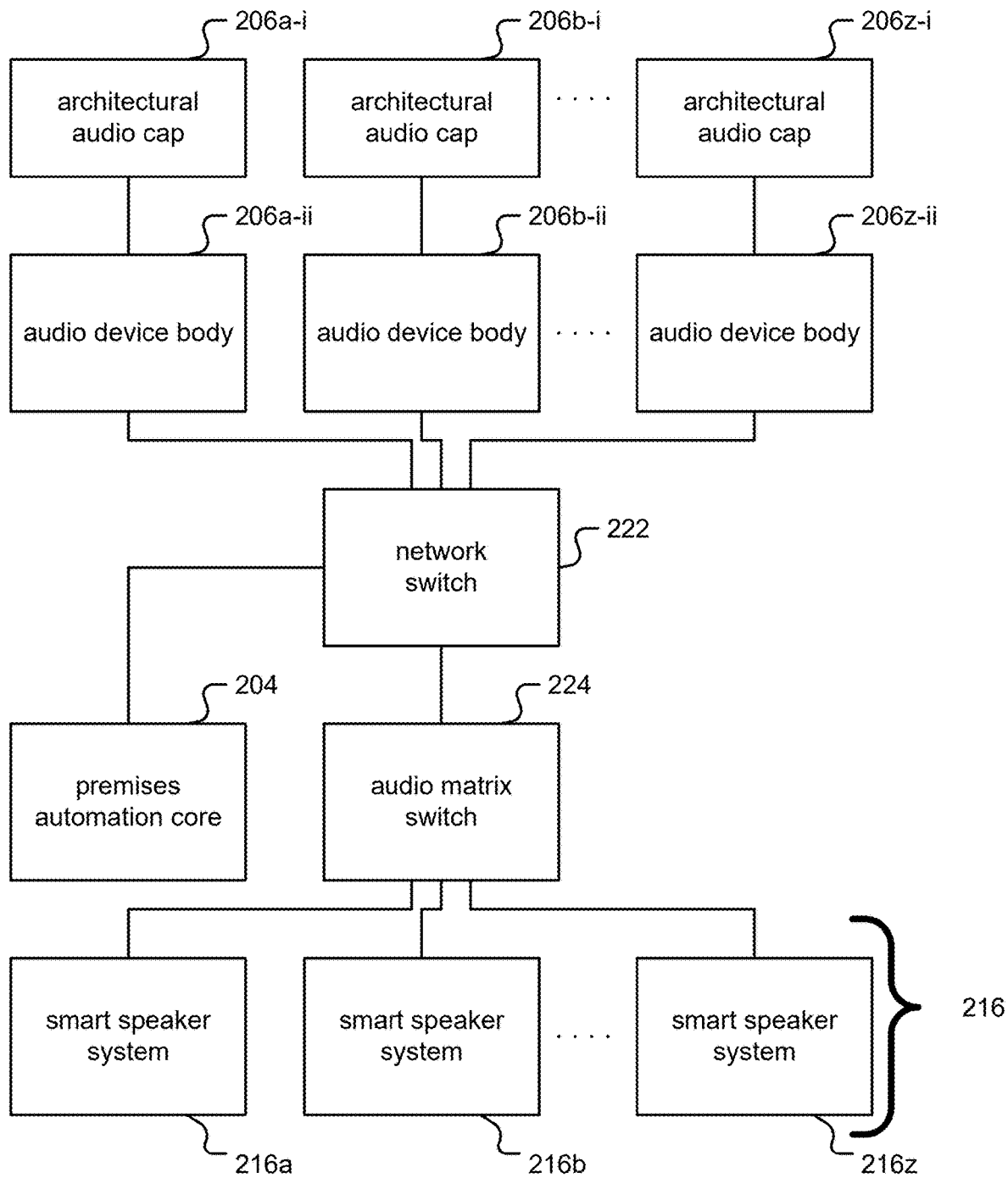
FIG. 2B is a block diagram illustrating an embodiment of an audio system for premises automation recommendations.

FIG. 2B is a block diagram illustrating an embodiment of an audio system for premises automation recommendations. In one embodiment, the audio system in FIG. 2B is at least part of the system in FIG. 2A to provide feedback to speech commands and/or provide music or media audio as a result of said speech commands.

An improvement for a premises automation system is having a large number of distributed audio input devices (206) so as to permit a user to communicate with the premises automation system from any region of the premises. In order to minimize construction costs and in order to maximize aesthetic compatibility with most rooms of a residential/commercial/industrial premises, the audio input devices (206) are "modular" and/or small. Without limitation, the input devices (206) may be video input devices, audio/video input devices, and/or devices with a different sensor other than an audio or video sensor; the example of audio is given herein by way of example.

In one embodiment, a given audio input device (206a) is made up of an architectural sensor, wherein "architectural" is defined herein as a device with a low-profile that may be compatible with a broad aesthetic and suitable for nearly any room, for example, a device less than 40 mm in length, less then 40 mm in width, and less than 4 mm thick from a finished surface, such as a finished wall surface. One example of an architectural sensor is one or more microphones, for example, a far-field microphone and/or microphone array. Other examples of an architectural sensor include: a camera, a motion sensor, a heat sensor, and another sensor to detect sensory or other input associated with a human present in the physical space around the device (206a).

In one embodiment, the input device (206a) includes a privacy switch that is itself architectural and low profile, for example, less than 0.5 mm thick. When the privacy switch is engaged, the humans present in a physical space in which the input device (206a) and an associated sensor are deployed are given an assurance of stronger privacy, for example, because the physical circuit path that electrically couples an output signal generated by the sensor to a premises automation system processing component is interrupted. In one embodiment, when the physical circuit path is interrupted, a human-observable indicator is given, for example, a painted switch position in the "privacy on" position, a visual cue such as one or more LEDs, and/or an audio cue such as one or more tones.

In one embodiment, the audio input device (206a) is modular, being made up of a low-profile architectural audio cap portion (206a-i) that is low-profile and in a given room, and an audio device body portion (206a-ii) which is recessed within a wall/ceiling/floor and interfaces with the cap (206a-i) inside said wall/ceiling/floor. The audio input device (206a) is modular in the sense that caps (206a-i) with other sensors, styles, and/or functionality may be interchanged by a user once a construction team has embedded the audio device body portion (206a-ii) in a wall/ceiling/floor.

In one embodiment, the audio device bodies (206a-ii), (206b-ii), . . . (206z-ii) are connected through a network connection, for example, an Ethernet connection such as a PoE (Power over Ethernet) coupling, to a network switch (222) or collection of network switches (222). The network switch (222) is also coupled to a premises automation core (204), also shown in FIG. 2A, and an audio matrix switch (224). An audio matrix switch (224) allows configuration of one or more audio inputs to be connected to one or more audio outputs. The audio outputs from the audio matrix switch include one or more smart speaker/amplifier systems (216), here shown to include at least three (216a), (216b), and (216z), also referred to as the amplifier (214) and speaker (215) combination in FIG. 2A.

Figure 3A:
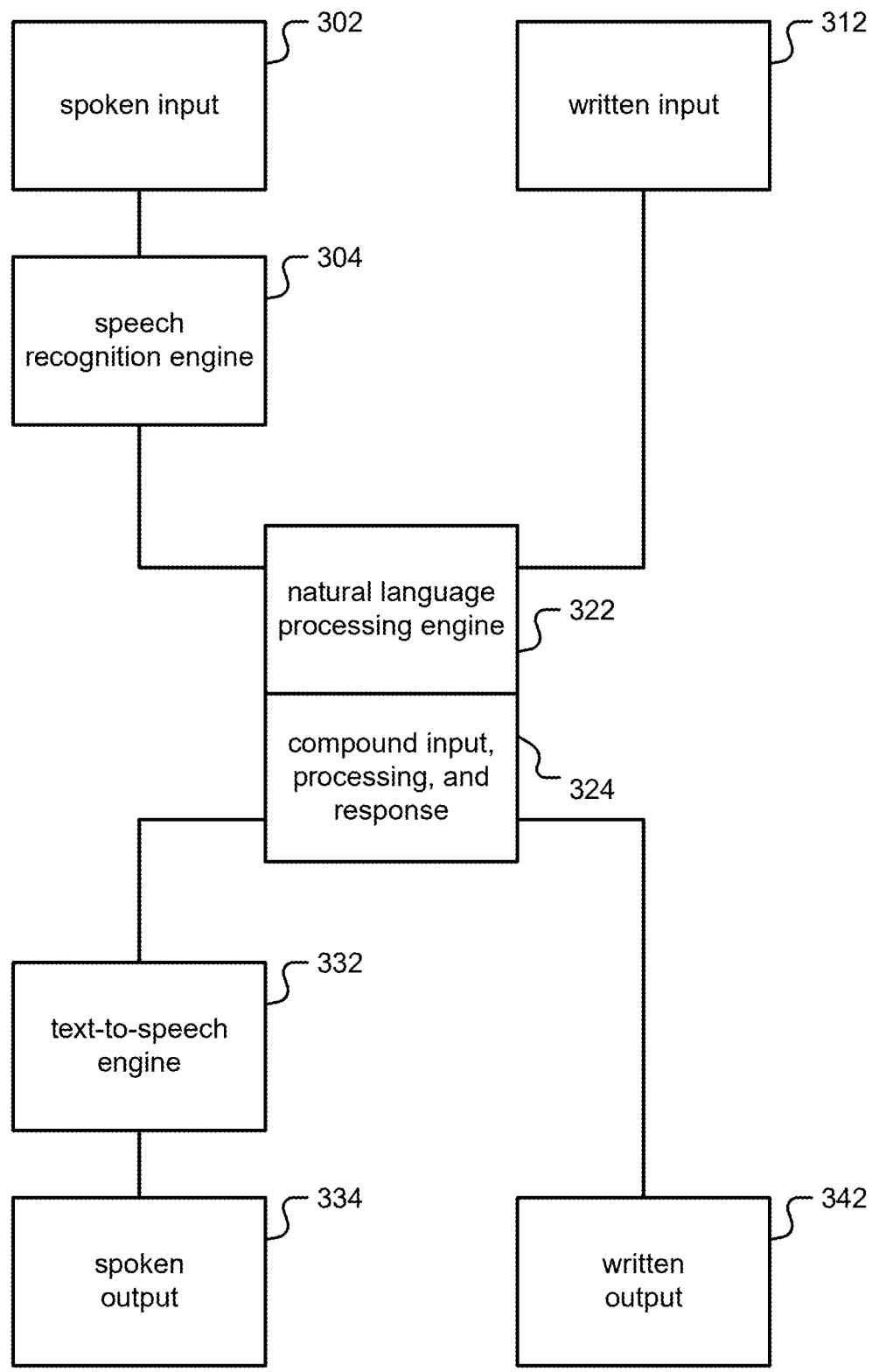
FIG. 3A is a block diagram illustrating an embodiment of a system for complex input speech and written processing.

FIG. 3A is a block diagram illustrating an embodiment of a system for complex input speech and written processing. In one embodiment, the system of FIG. 3A is at least part of the premises automation system (204) and/or control output device (212a) in FIG. 2A.

As FIG. 3A illustrates, input may be spoken and/or written, and output may be spoken and/or written. Spoken input (302) is processed by a speech recognition engine (304) before being passed to the natural language processing engine (322). Written input (312) may be processed directly by the natural language processing engine (322). In one embodiment, written input (312) may correct, add, edit, and/or delete the resultant input from spoken input (302) and speech recognition engine (304).

Note that in some cases, the spoken input (302) and/or written input (312) may have little or no punctuation, capitalization, and/or proper nouns recognized. Natural language processing engine (322) applies rules and couples the system for complex/compound input, processing, and response (324). User notification of responses includes written output (342) from system (324), and may include a text-to-speech engine (332) to provide spoken output (334) as well.

Figure 3B:
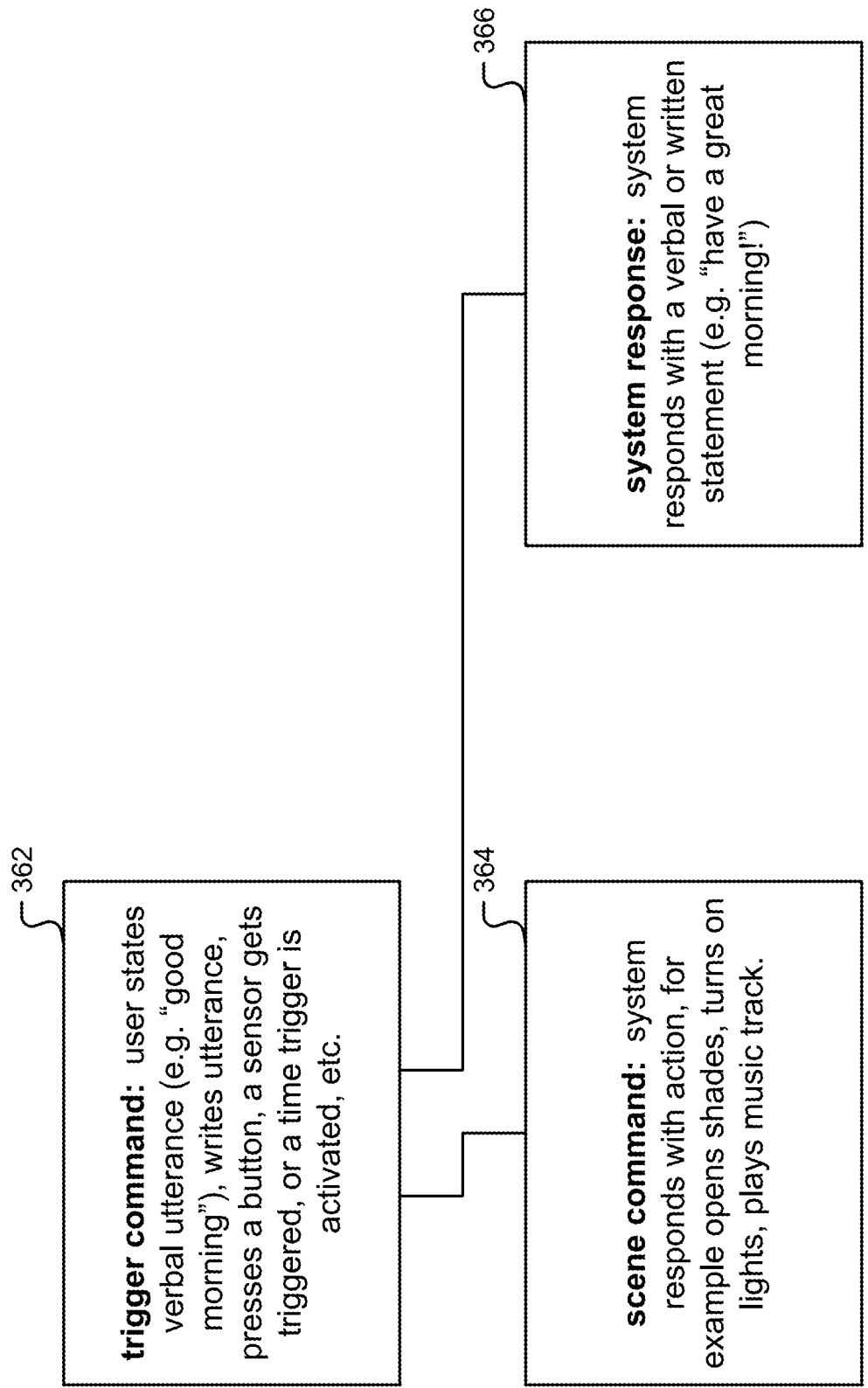
FIG. 3B is an illustration of a trigger and corresponding scene command.

FIG. 3B is an illustration of a trigger and corresponding scene command. In one embodiment, the illustration of FIG. 3B is carried out by the system (204) of FIG. 2A.

Trigger command (362) is an action that triggers a scene. In the example of FIG. 3B, the action includes: a voice command, for example, a user that says "Good morning"; a button press, for example, a user that presses a button titled "Morning"; a triggered sensor; and/or a triggered time, for example, based on a schedule.

After the system is triggered (362), the system may optionally respond with a "scene" command (364). Examples given in FIG. 3B include opening the shades, turning on the lights, and playing a musical track. A scene command, also referred to herein as a "premises automation scene," is a convenient way to refer to one or more aspects of premises automation. For example, a "good morning" command may include opening the shades, turning on the lights, and playing a musical track suitable for mornings because the user prefers to start their morning with these aspects of premises automation. After the system is triggered (362), a system response (366) may optionally be issued by responding with a written or verbal output, for example, "Have a great morning!"

Figure 4A:
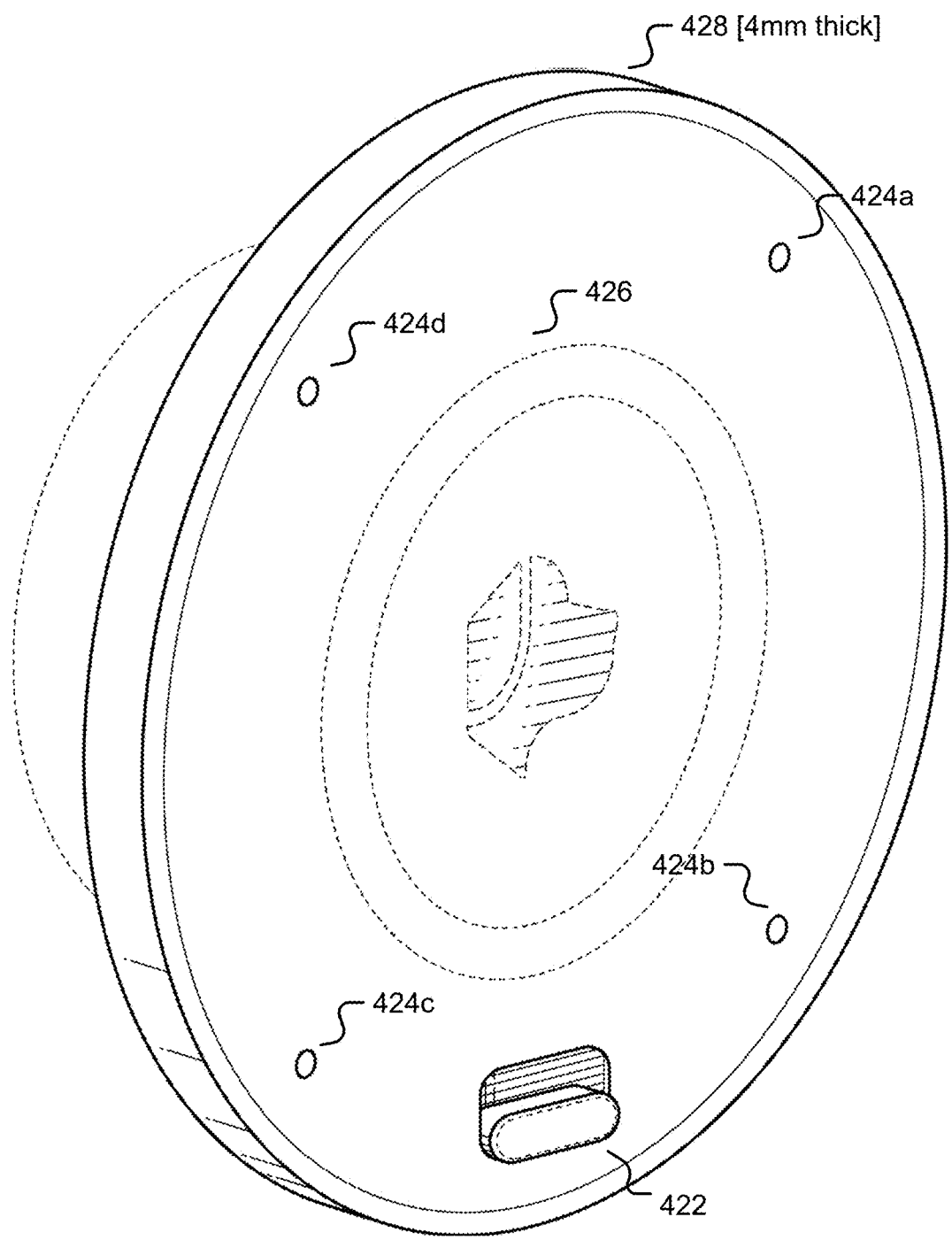
FIG. 4A is an illustration of an embodiment for an architectural audio/microphone cap.

FIG. 4A is an illustration of an embodiment for an architectural audio/microphone cap. In one embodiment, the illustration of FIG. 4A is depicted as component (206a-i), (206b-i), . . . (206z-i) in FIG. 2B.

The cap of FIG. 4A has one or more privacy switches (422). In one embodiment, the physical privacy switch (422) is a switch that assures users of privacy by disrupting a physical and/or electrical connection associated with the input sensor of the cap, for example, it electrically and/or physically disconnects all the microphones and/or cameras. The physical privacy switch (422) may be in the front face of the cap. The cap also comprises at least one sensor such as a microphone referred to herein as "(424)", here shown in FIG. 4A as a far-field microphone and/or microphone array of four microphones (424a), (424b), (424c), (424d). The cap may contain one or more cameras and/or light-sensing/heat-sensing sensors (not shown in FIG. 4A). In one embodiment, the cap includes an indicator for feedback, for example, a visual indicator, an LED, or a multicolored LED ring (426). As described above, to improve useability of the cap in any room and improve aesthetics, the cap is designed to be low-profile, here shown to have a thickness of 4 mm (428) from its finished surface such as a finished wall surface.

Figure 4B:
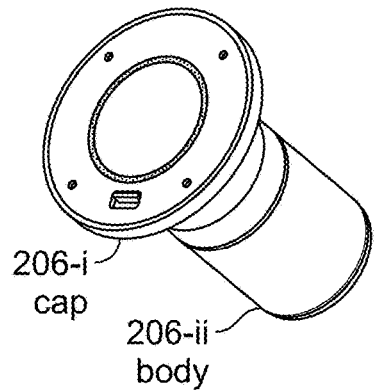
FIG. 4B is an illustration of an embodiment for an architectural microphone.

FIG. 4B is an illustration of an embodiment for an architectural microphone. In one embodiment, the cap (206-i) of FIG. 4B is also shown in FIG. 4A. As shown, the body (206-ii) is designed to allow interchange of cap (206-i) of various designs and functionality, and the body (206-ii) remains in the wall.

Figure 4C:
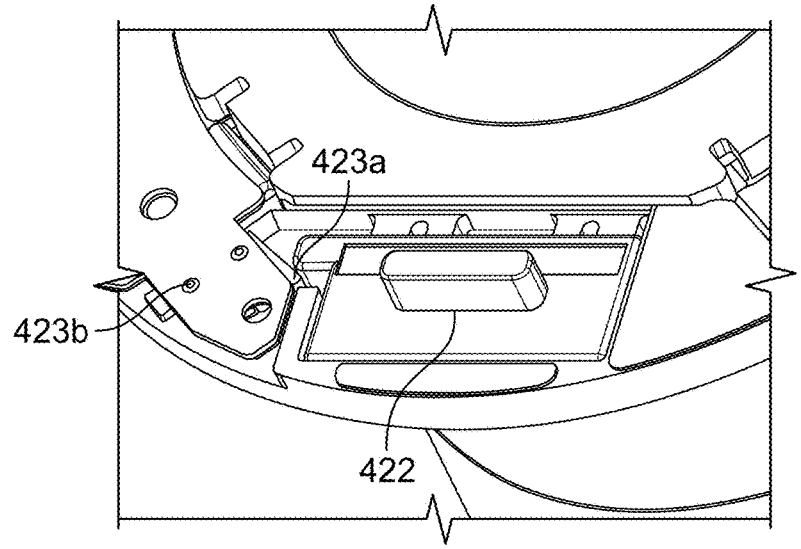
FIG. 4C is an illustration of an embodiment for a low-profile privacy switch in a privacy setting.

FIG. 4C is an illustration of an embodiment for a low-profile privacy switch in a privacy setting. In one embodiment, a switch such as a slider switch (422) is part of the cap in FIG. 4A. To be an architectural microphone, an improved aspect for widespread acceptance and aesthetic is a low-profile of less than 4 mm thickness. Thus, switches may use an adjacent mechanical coupling to an actuator linkage in the same plane as the finished surface of the cap in FIG. 4A. For example, if the cap is mounted in the wall, the actuator linkage may be along the plane of the wall. One example of such a two-dimensional/adjacent mechanical coupling is a cantilever (423a) such as an internal micro switch pivoted by one or more points (423b) in order to provide physical and/or electrical continuity. Thus, when the slider switch (422) is in a "privacy mode" or privacy setting, the cantilever disrupts the physical/electrical continuity of input devices such as the microphone.

In one embodiment, the exposed part of the switch is a slider switch (422) that has one end pushing the internal micro switch (423a). The slider switch (422) may be non-conductive and may be mounted between hooks that generate a haptic/observable click when the slider switch (422) moves to a privacy (sensor off) detent position or to public (sensor on) detent position. To reduce wear over time, the slider switch (422) slides along a slide guide. The internal micro switch (422) may be a detector switch. The planar/internal micro switch (423) may slide under a circuit planar contact of the microphones, and may physically disengage the circuit planar contact when pushed into the position shown in FIG. 4C. As shown in FIG. 4C, the internal switch (423) may have two or more 'arms' to provide stability when interrupting the circuit planar contact.

The physical circuit path that is connected or interrupted by an internal switch (423) may be a power circuit path or a signal circuit path. In an embodiment not shown in FIG. 4C, an inverted setup may be used where the planar contact is ground, and connecting the physical circuit path in effect short-circuits and/or grounds the signal and/or power of the sensor, establishing privacy. In this inverted setup, interrupting the physical circuit path effectively open-circuits the ground plane from the signal/power of the sensor, allowing the sensor to detect humans in the nearby physical space.

Figure 4D:
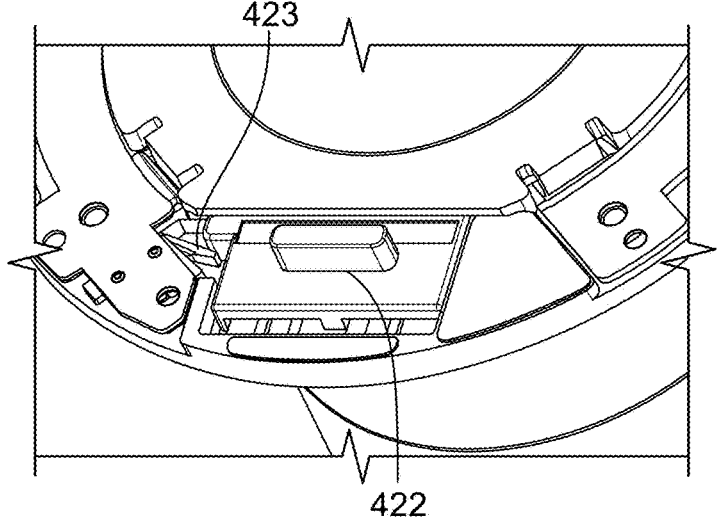
FIG. 4D is an illustration of an embodiment for a low-profile privacy switch in a nominal setting.
Figure 4E:
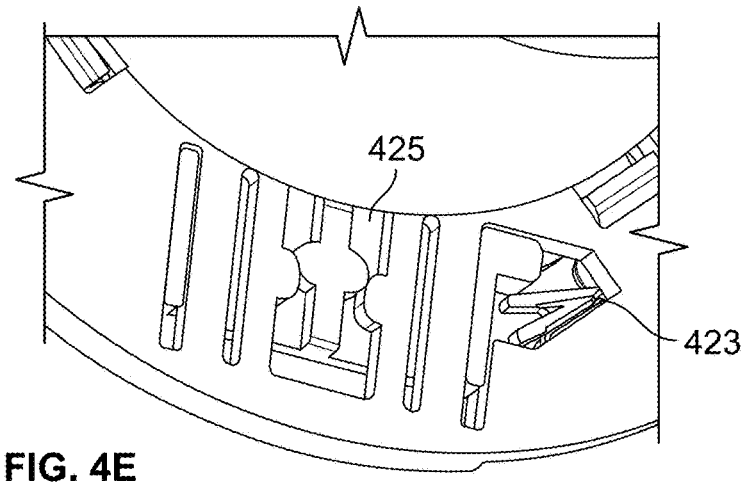
FIG. 4E is an illustration of an embodiment of a low-profile privacy switch from a rear perspective.

FIG. 4D is an illustration of an embodiment for a low-profile privacy switch in a nominal setting. Similar to FIG. 4C, when the slider switch (422) is in a "nominal mode," the cantilever (423) is returned to a position that provides physical/electrical continuity of input devices such as the microphone, allowing them to record input. FIG. 4E is an illustration of an embodiment of a low-profile privacy switch from a rear perspective. The rear perspective allows further illustration of the cantilever (423) for the privacy switch and the hooks (425) for the haptic/observable detent positions.

Without limitation, other linkage and/or switch mechanisms may be used other than that shown in FIGS. 4C-4E. To maintain an architectural physical privacy switch, a lower profile may be achieved in part by using a slider or other physical switch in the same plane as components to connect/interrupt the physical circuit path between sensor and back-end via a linkage. In one embodiment, the physical privacy switch is architectural by being a two-dimensional switch, such as a two-dimensional slider switch.

Figure 5:
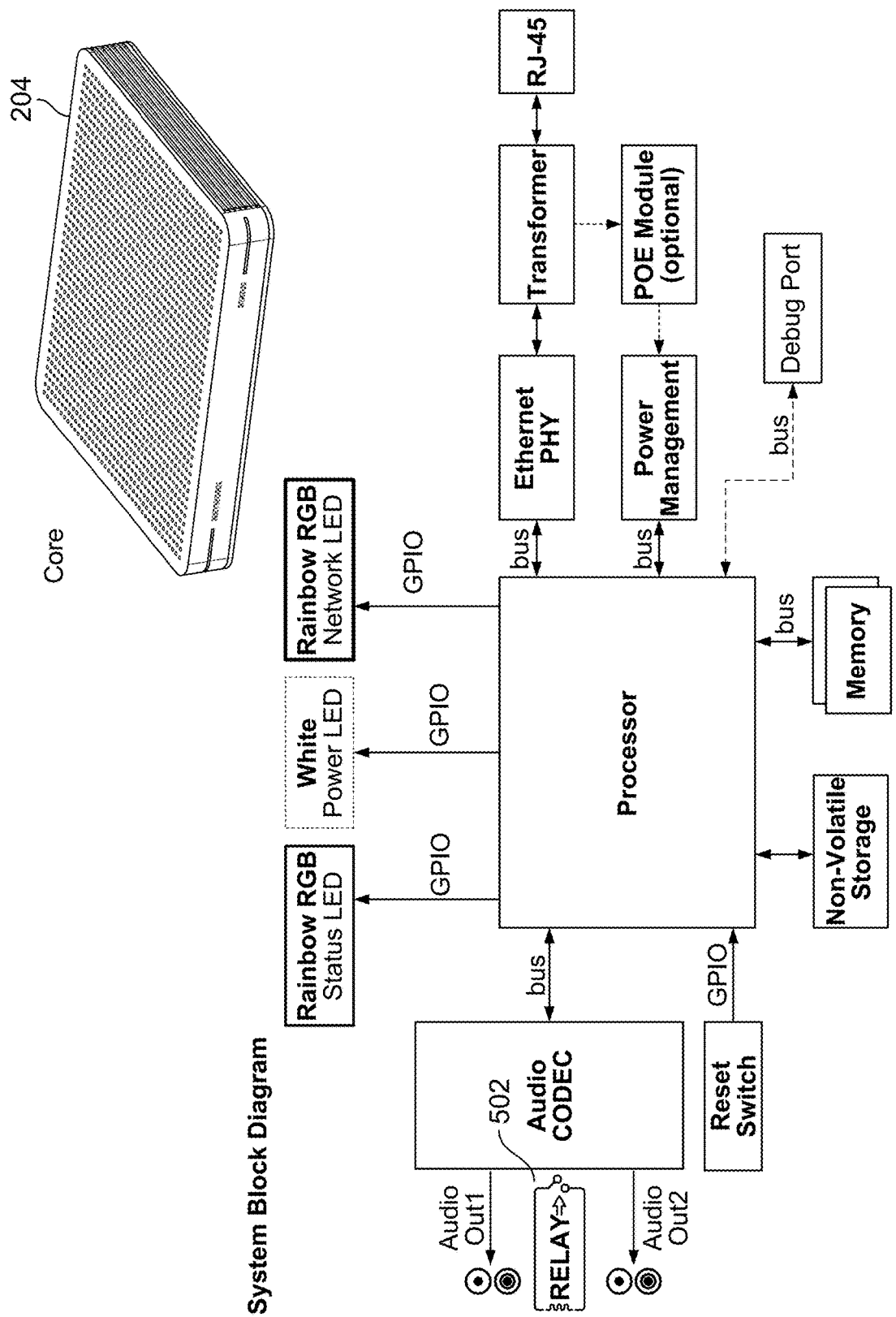
FIG. 5 is a block diagram illustrating an embodiment of a system for a premises automation core.

FIG. 5 is a block diagram illustrating an embodiment of a system for a premises automation core. In one embodiment, the block diagram of FIG. 5 is of the premises automation core (204) of FIG. 2A. The core (204) comprises at least one of the following: an RJ-45 connector, a transformer, an Ethernet PHY, an optional POE module, a power management subsystem, a processor, a status LED, a power LED, a network LED, memory, non-volatile storage, a debug port, a reset switch, and/or audio codec. The audio codec includes a physical relay (502).

Figure 6A:
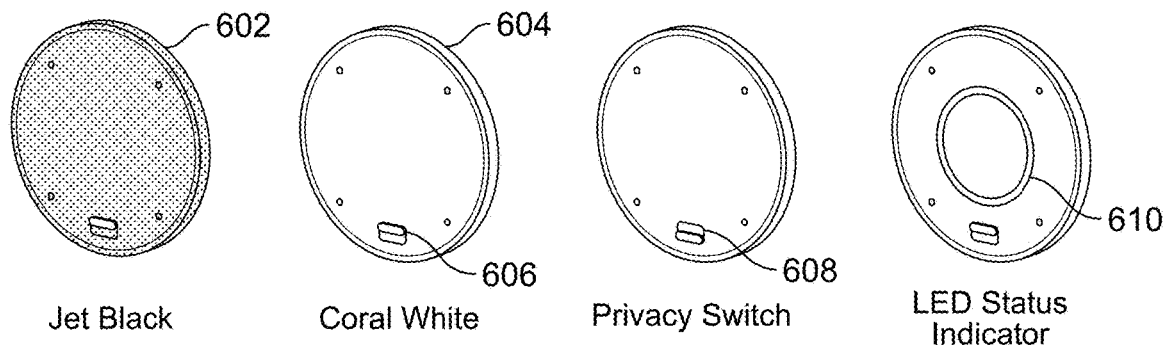
FIG. 6A is an illustration of a visual example of the architectural cap of FIG. 2B.

FIG. 6A is an illustration of a visual example of the architectural cap of FIG. 2B. An architectural cap (206a-i) may come in different colors to match paint, here shown in jet black (602) and coral white (604). The coral white (604) example cap also shows what a physical privacy switch may appear like to humans when the sensor is observing (606). Once a physical privacy switch is set to "privacy please,"

meaning the sensor is physically/electrically decoupled by interrupting a physical circuit path, it may appear like (608) to humans. In the example shown in FIG. 6A, the switch position is painted/dyed/cast as non-white such as red, so as to show privacy is more assured even when power is out. As shown in FIG. 6A, a physical indicator may be provided such as an LED status indicator (610). This may show as red when a virtual privacy switch is asserted. A virtual privacy switch is a traditional home automation privacy switch where a physical circuit path may be unchanged from a non-privacy setting, but the system agrees to at least partially ignore sensor input. A physical privacy switch is an improvement over a virtual privacy switch because it gives a greater assurance that device manufacturers and/or cloud server operators are not inadvertently and/or maliciously observing private behavior.

Figure 6B:
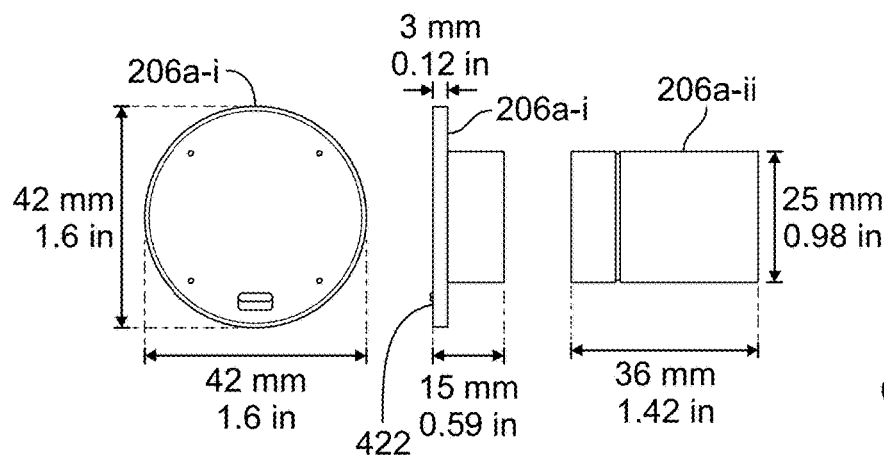
FIG. 6B is an illustration of a device example of the architectural cap of FIG. 2B.
Figure 6B:
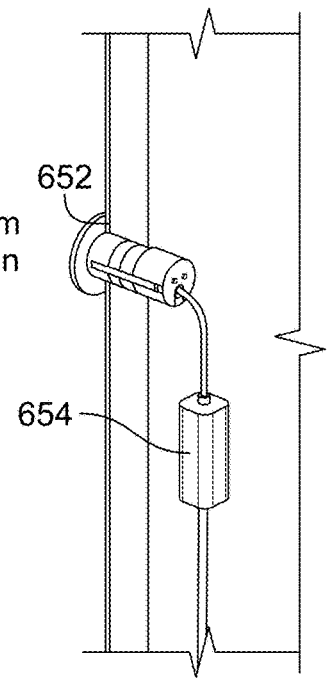

FIG. 6B is an illustration of a device example of the architectural cap of FIG. 2B. A low-profile architectural cap (206a-i) that is acceptable aesthetically is described herein as one that is between 5 mm-45 mm in width and in length, for example 42 mm, and between 1 mm and 5 mm in depth, for example 3 mm, from a finished surface such as a finished wall surface as observed from a human in the physical space of the cap. The slider switch (422) may add an additional depth of less than 0.5 mm. As shown in FIG. 6B, the cap may have additional unobservable depth of between 10 mm-20 mm, for example 15 mm, behind the cap, in a socket of diameter of between 5 mm-30 mm, for example 25 mm, in a wall/floor/ceiling. The cap (206a-i) may interface with a device body (206a-ii) of depth between 5 mm-45 mm, for example 36 mm. FIG. 6B also includes a composite perspective (652) of how the cap (206a-i), body (206a-ii), and PoE module (654) may integrate at a premises, for example a wall.

Figure 7A:
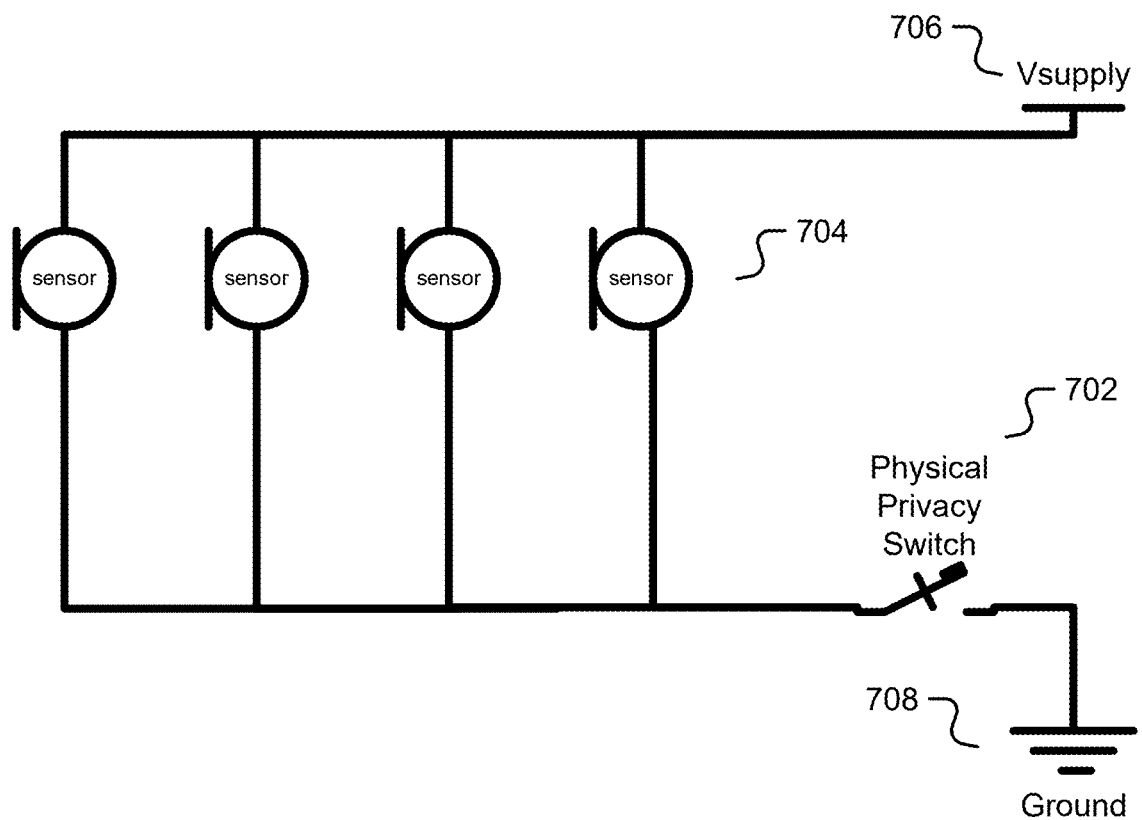
FIG. 7A is a diagram illustrating an embodiment of a physical privacy switch connecting/interrupting sensors in parallel.

FIG. 7A is a diagram illustrating an embodiment of a physical privacy switch connecting/interrupting sensors in parallel. In one embodiment, the physical privacy switch (702) is the slider switch (422) and the sensors are the microphone array (424a), (424b), (424c), (424d) in FIG. 4A. In the example of FIG. 7A, the physical circuit path that the sensors (704) all use in parallel is a power bus from a supply voltage (706) to ground (708), for example, a 3.3 VDC (706) supply, but without limitation this principle may operate on other power busses or signal busses.

As shown in FIG. 7A, when sensors are connected in a parallel bus, the physical circuit path is interrupted by switching the physical privacy switch (702) from a first position shown in (606) of FIG. 6A to a second position shown in (608) of FIG. 6A. The output signal generated by all parallel connected sensors (704) is then electrically decoupled from a premises automation system processing component, for example, the audio device body (206a-ii) and/or premises automation core (204) in FIG. 2B. In one embodiment, a position input is transmitted to the audio device body (206a-ii) and/or premises automation core (204) indicating the physical privacy switch is in the second position.

Conversely, when the physical circuit path is connected by switching the physical privacy switch (702) from the second position (608) to the first position (606), the output signal generated by all parallel connected sensors (704) is electrically coupled to a premises automation system processing component (206a-ii), (204).

Figure 7B:
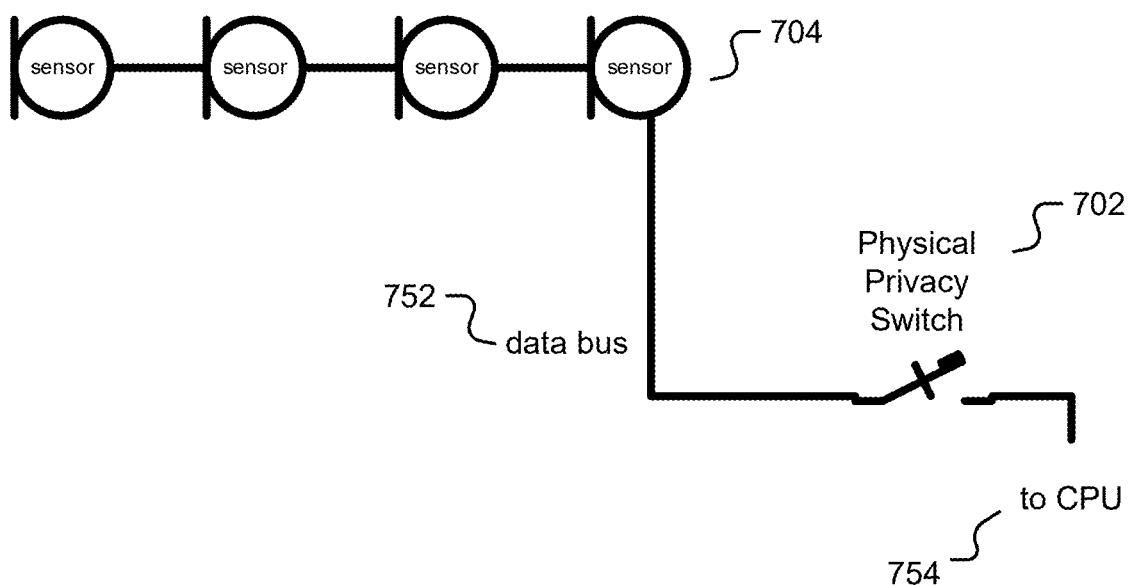
FIG. 7B is a diagram illustrating an embodiment of a physical privacy switch connecting/interrupting sensors in series.

FIG. 7B is a diagram illustrating an embodiment of a physical privacy switch connecting/interrupting sensors in series. In one embodiment, the physical privacy switch (702) is the slider switch (422) and the sensors are the microphone array (424a), (424b), (424c), (424d) in FIG. 4A. In the example of FIG. 7B, the physical circuit path that the sensors (704) all use in series is a data bus (752) to a CPU (754), for example, a premises automation system processing component like body (206a-ii) or core (204) in FIG. 2B, but without limitation, this principle may operate on other power busses or signal busses.

As shown in FIG. 7B, when sensors are connected in a series bus, the physical circuit path is interrupted by switching the physical privacy switch (702) from a first position shown in (606) of FIG. 6A to a second position shown in (608) of FIG. 6A. The output signal generated by all series connected sensors (704) is then electrically decoupled from a premises automation system processing component, for example, the audio device body (206a-ii) and/or premises automation core (204) in FIG. 2B, because the data bus (752) has been electrically opened/inoperable. Conversely, when the physical circuit path is connected by switching the physical privacy switch (702) from the second position (608) to the first position (606), the output signal generated by all series connected sensors (704) is electrically coupled to a premises automation system processing component (206a-ii), (204) by the data bus (752) being electrically closed/operable.

Figure 7C:
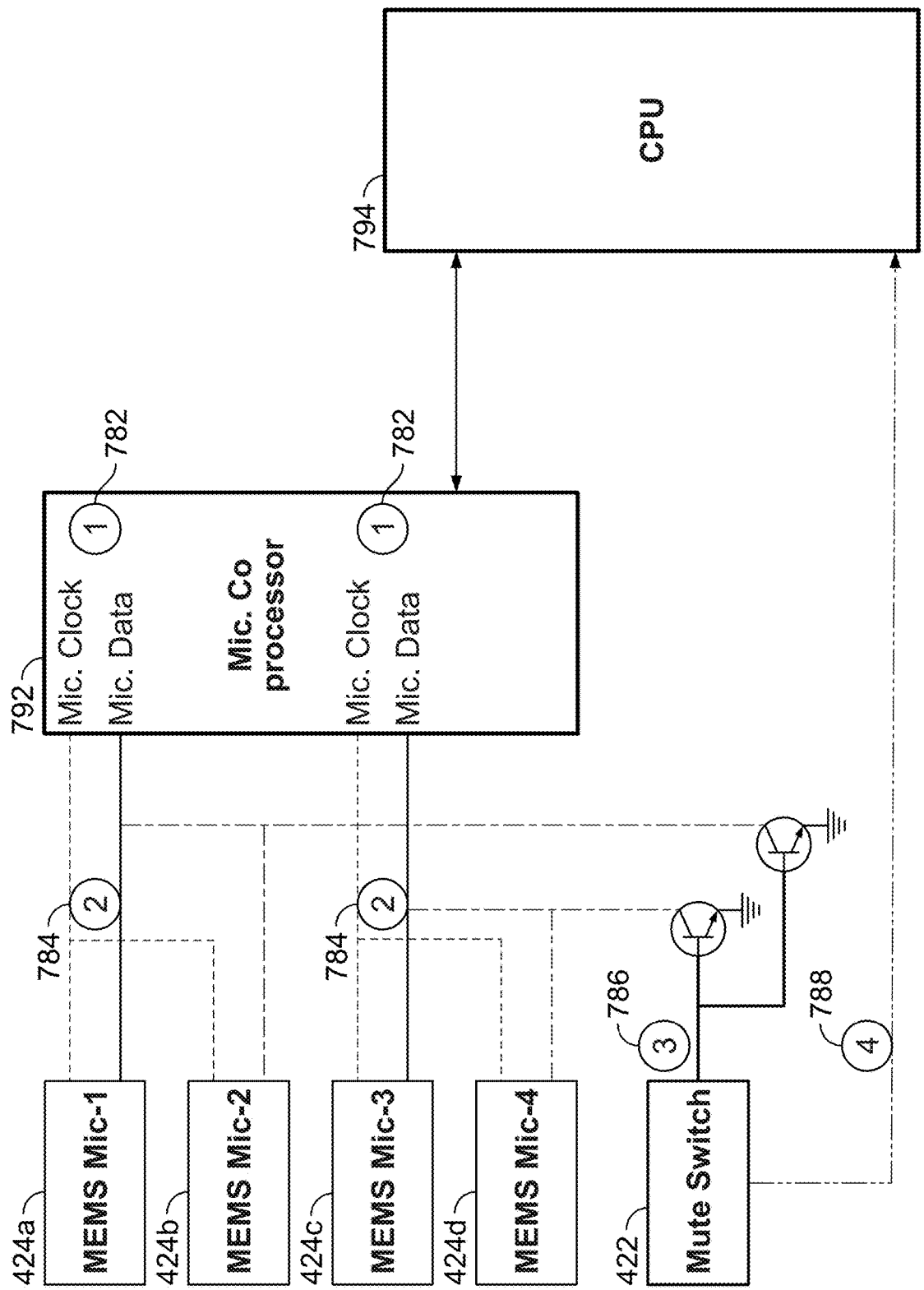
FIG. 7C is a system diagram for physical privacy.

FIG. 7C is a system diagram for physical privacy. In one embodiment, the system of FIG. 7C is an alternative to those shown in FIGS. 7A and 7B. As shown in FIG. 4A, one embodiment of an architectural audio/microphone cap is one with a physical privacy switch (422) and a plurality of microphones (424a), (424b), (424c), (424d) forming a far-field array/microphone array.

As shown in FIG. 7C, a microphone coprocessor (792) may be used and without limitation may be located at least in part in the cap (206-i), the body (206-ii), and/or premises automation core (204) of FIG. 2B. Similarly a CPU (794) may be used and without limitation may be located at least in part in the cap (206-i), the body (206-ii), and/or premises automation core (204) of FIG. 2B.

In the system of FIG. 7C, as shown with the circled "1"s the four microphone/channels (424) are synchronized (782) with a clock signal from the microphone coprocessor (792). In one embodiment, as shown with the circled "2"'s the microphones (424) are connected on a data line and synchronized with the falling and rising edge of the data line (784). As shown with the circled "3", the physical privacy switch (422) is mechanically coupled as shown for example in FIGS. 4C, 4D, and 4E to transistors. When the switch (422) is actuated (mute on, or privacy on), the transistor puts the data to a low status, which stops the microphones (424) from giving out data signals (786). As shown with the circled "4", to allow the CPU (794) to know if the switch (422) is at a mute/privacy position, it is also connected to the CPU (794).

Thus, physical privacy is done through the transistors, and the through the signal sent to the CPU (794). A software/virtual privacy switch may be implemented at either the CPU (794) or microphone coprocessor (792), but in this case the microphones (424) may still give out data signals, which may be hacked or captured.

Figure 8A:
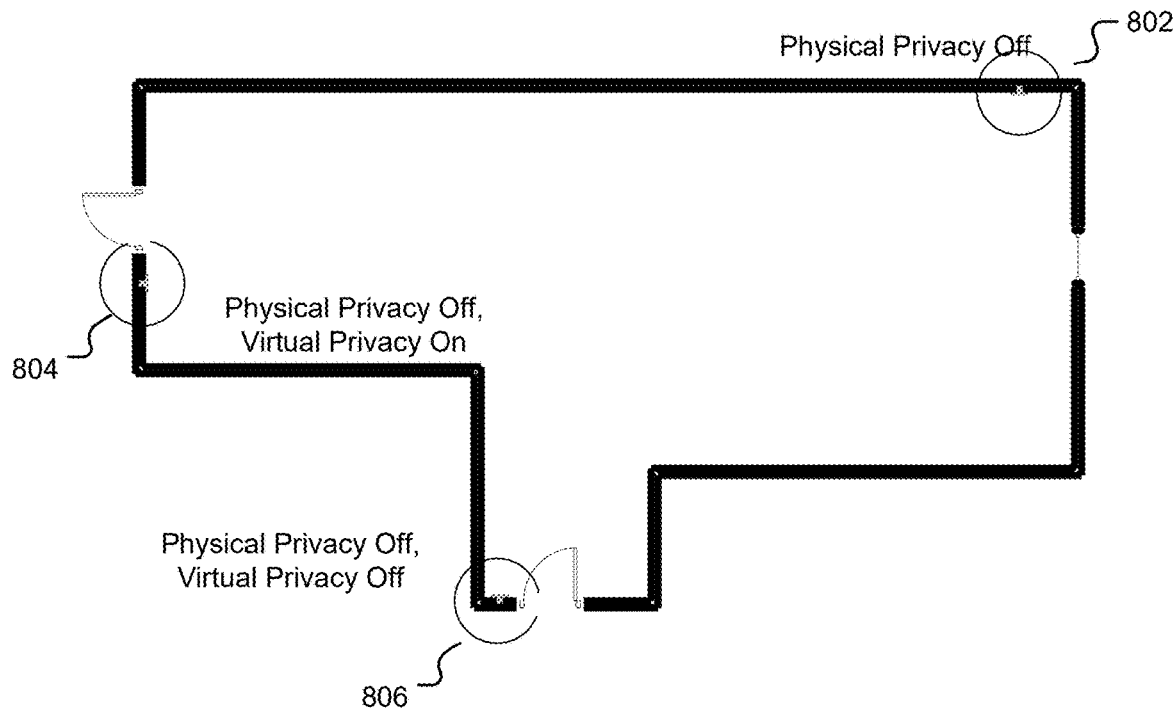
FIG. 8A is an illustration of a room with three coordinated devices.

FIG. 8A is an illustration of a room with three coordinated devices. In one embodiment, the devices (802), (804), and (806) are examples of the device (206a) in FIG. 2A. In a larger room such as that depicted in FIG. 8A, there may be a plurality of devices, and so the privacy switch may coordinate with other nearby devices. The example of FIG. 8A shows a state that each device is in to start with:

a. Device (802) has the physical privacy switch turned off, for example, as shown in (606) in FIG. 6A;

b. Device (804) also has the physical privacy switch turned off, but has a virtual privacy mode turned on. In one embodiment, a virtual privacy mode may be selected using an app or may be predetermined by a processor such as one in premises automation core (204) in FIG. 2B. A virtual privacy mode on may indicate that the sensors of device (804) may be ignored, and an LED ring (426) of FIG. 4A for device (804) may indicate a color such as red.

c. Device (806) also has the physical privacy switch turned off and the virtual privacy mode turned off.

Figure 8B:
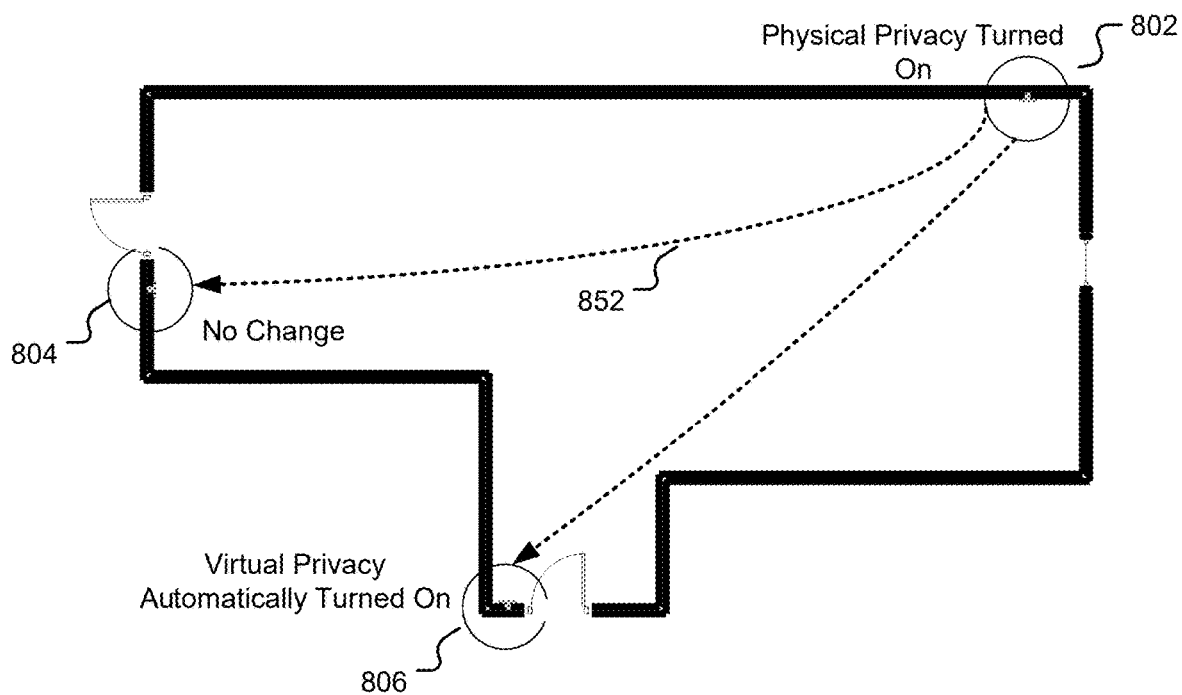

FIG. 8B is an illustration of a room with three coordinated devices after a physical privacy switch is turned on. In one embodiment, this illustration is a successor of the devices shown in FIG. 8A.

When device (802) has its physical privacy switch turned on, for example, by sliding the switch to that shown in (608) in FIG. 6A, a "chain reaction" (852) may occur if configured to by an app or by the premises automation core (204). This chain reaction may avoid a privacy contention issue where a nearby human wishes privacy for a given room but other nearby devices are not necessarily in a privacy mode. In one embodiment, the chain reaction may occur to other nearby rooms, other rooms on the same floor, or all rooms in a given premises/building/campus. In the event of a physical privacy switch (802) turning on, the chain reaction (852) may turn all virtual privacy modes of nearby devices (804), (806) on, if they are not already on.

Figure 9A:
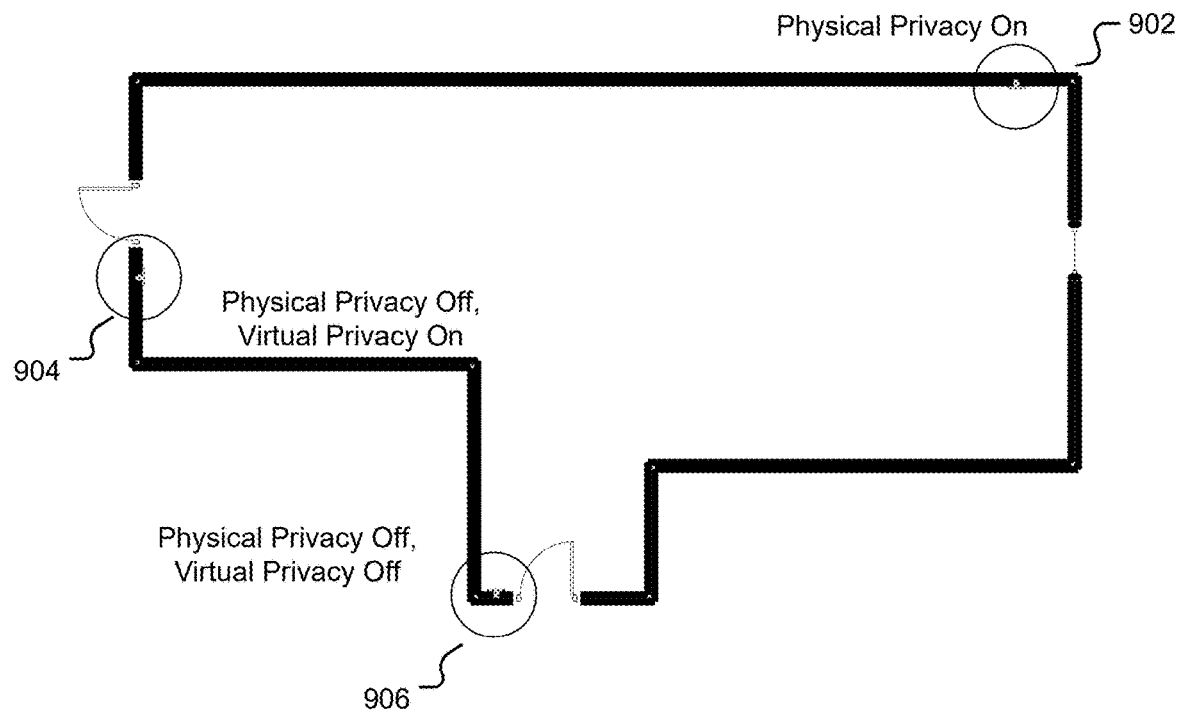
FIG. 9A is an illustration of a room with three coordinated devices starting in a physical privacy on state.

FIG. 9A is an illustration of a room with three coordinated devices starting in a physical privacy on state. In one embodiment, the devices (902), (904), and (906) are examples of the device (206*a*) in FIG. 2A. The example of FIG. 9A shows a state that each device is in to start with:

a. Device (902) has the physical privacy switch turned on, for example, as shown in (608) in FIG. 6A;

b. Device (904) has the physical privacy switch turned off, but has a virtual privacy mode turned on.

c. Device (906) also has the physical privacy switch turned off and the virtual privacy mode turned off.

Figure 9B:
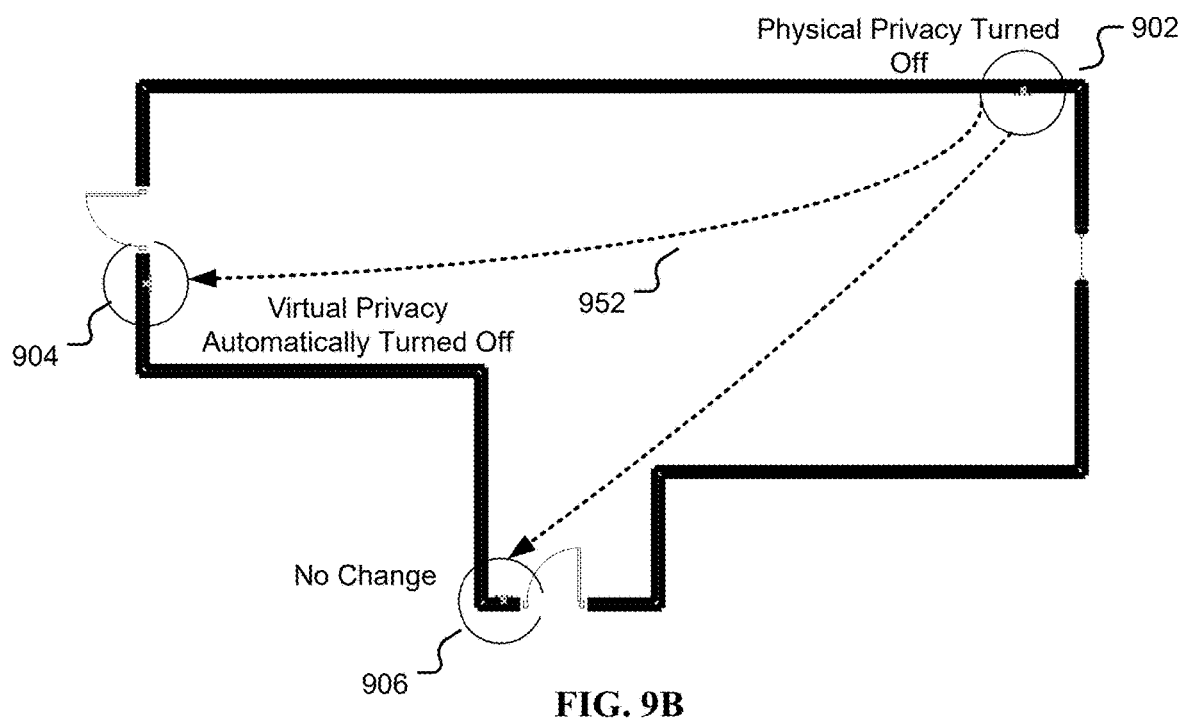
FIG. 9B is an illustration of a room with three coordinated devices after a physical privacy switch is turned off.

FIG. 9B is an illustration of a room with three coordinated devices after a physical privacy switch is turned off. In one embodiment, this illustration is a successor of the devices shown in FIG. 9A.

When device (902) has its physical privacy switch turned off another "chain reaction" (952) may occur if configured to by an app or by the premises automation core (204). This chain reaction may provide a convenience to 'clear' privacy settings in the room after a private session has ended. In one embodiment, the chain reaction may occur to other nearby rooms, other rooms on the same floor, or all rooms in a given premises/building/campus. In the event of a physical privacy switch (902) turning off, the chain reaction (952) may de-assert and/or turn all virtual privacy modes of nearby devices (904), (906) off, if they are not already off.

In one embodiment, another user convenience to clear a virtual privacy switch for a local device is similar to that shown in FIGS. 9A-9B; if a user sees that the local device indicates a virtual privacy session, for example a red LED ring, and the user wishes to lift the virtual privacy session, instead of accessing an app, the user may directly reach out to the local device and move the physical privacy switch from "on" (608) to "off" (606). If the local device happened to be already in an "off" (606) position, it may still be more convenient for the user to "toggle" the physical privacy switch from "off" (606) to "on" (608) to "off" (606) in subsequent motion to clear the red LED ring/virtual privacy setting.

Although the foregoing embodiments have been described in some detail for purposes of clarity of understanding, the invention is not limited to the details provided. There are many alternative ways of implementing the invention. The disclosed embodiments are illustrative and not restrictive.

What is claimed is:

1. A premises automation system, comprising:
    a premises automation input device configured to be deployed in a physical space, the premises automation input device including:
        a first sensor;
        a second sensor;
        a first physical circuit path that electrically couples a first output signal generated by the first sensor to the premises automation system;
        a second physical circuit path that electrically couples a second output signal generated by the second sensor to the premises automation system;
        a virtual privacy mode, wherein a request is made for the premises automation system to ignore both the first sensor and the second sensor when the virtual privacy mode is on; and
    a physical privacy switch having a first position and a second position, wherein the physical privacy switch connects the first physical circuit path and the second physical circuit path simultaneously when in the first position and interrupts the first physical circuit path and the second physical circuit path simultaneously when in the second position; and
    a processor coupled to the premises automation input device and configured to:
        receive a position input indicating that the physical privacy switch is in the second position;
        implement a privacy chain reaction with other premises automation input devices deployed in the physical space, wherein:
            in a first event the physical privacy switch changes from the first position to the second position, then the privacy chain reaction automatically turns all virtual privacy modes of other premises automation input devices with their respective physical privacy switches being in their respective first positions deployed in the physical space on; and
            in a second event the physical privacy switch changes from the second position to the first position, then the privacy chain reaction automatically turns all virtual privacy modes of other premises automation input devices with their respective physical privacy switches being in their respective first positions deployed in the physical space off.

2. The premises automation system of claim 1, wherein the processor is further configured to indicate to a user of the premises automation system that the device is in a physical privacy mode based at least in part on the position input.

3. The premises automation system of claim 1, wherein the processor is further configured to indicate to a user of the premises automation system that the device will not observe any human in the physical space based at least in part on the position input.

4. The premises automation system of claim 1, wherein the processor is further configured to receive a second input indicating that a virtual privacy switch is asserted and to indicate to a user of the premises automation system that the device is in a virtual privacy mode based at least in part on the second input.

5. The premises automation system of claim 1, wherein the device includes a physical indicator, and wherein the processor is further configured to receive a second input indicating that a virtual privacy switch is asserted and to assert the physical indicator.

6. The premises automation system of claim 5, wherein the physical indicator is a visual indicator or LED (Light Emitting Diode) ring.

7. The premises automation system of claim 5, wherein the virtual privacy switch is de-asserted in an event that a human present in the physical space switches the physical privacy switch from the second position to the first position.

8. The premises automation system of claim 5, wherein the virtual privacy switch on a nearby device is asserted in an event that a human present in the physical space switches the physical privacy switch from the first position to the second position.

9. The premises automation system of claim 1, wherein the sensor is at least one of the following: a microphone, a microphone array, a camera, a motion sensor, a heat sensor, or another sensor to detect sensory or other input associated with a human present in the physical space.

10. The premises automation system of claim 1, wherein the device comprises an architectural cap portion in space and a body portion recessed into a wall, wherein the architectural cap portion is less than 4 mm thick from a finished surface, and wherein the physical privacy switch is less than 0.5 mm thick.

11. The premises automation system of claim 1, wherein the device further includes an LED (Light Emitting Diode), and wherein the processor is further configured to turn the LED a specific privacy color in the event the virtual privacy mode is on.

12. The premises automation system of claim 11, wherein the privacy chain reaction comprises turning every LED to the specific privacy color for all devices deployed in the physical space.

13. The premises automation system of claim 11, wherein the privacy chain reaction comprises clearing every LED of the specific privacy color for all devices deployed in the physical space.

14. The premises automation system of claim 1, wherein the physical space comprises at least one of the following: a room, a floor, a building, a premises, or a campus.

15. The premises automation system of claim 1, wherein the processor is further configured to implement a privacy convenience clearing based at least in part on the physical privacy switch changing position.

16. The premises automation system of claim 15, wherein the privacy convenience clearing clears virtual privacy mode for the device based at least in part on the physical privacy switch changing from second position to first position.

17. The premises automation system of claim 1, wherein the first sensor and second sensor are coupled in a parallel bus and wherein an output signal generated by both parallel connected sensors is electrically decoupled from a premises automation system processing component by switching the physical privacy switch from the first position.

18. The premises automation system of claim 17, wherein the parallel bus is a power bus from a supply voltage to ground.

19. The premises automation system of claim 1, wherein the first sensor and second sensor are coupled in a series bus and wherein an output signal generated by both series connected sensors is electrically decoupled from a premises automation system processing component by switching the physical privacy switch from the first position.

20. The premises automation system of claim 19, wherein the series bus is a data bus from both the first sensor and the second sensor to a processing unit.

21. The premises automation system of claim 1, wherein the first sensor and second sensor are each synchronously coupled via a clocked data line and wherein the first sensor and second sensor are simultaneously electrically decoupled from the premises automation system by using a transistor to drive the clocked data line to stop both first sensor and second sensor from giving out data signals.

22. The premises automation system of claim 1, wherein the virtual privacy mode is selected using a remote app or remote system.

* * * * *